(12) United States Patent
Slesinski et al.

(10) Patent No.: US 7,690,449 B2
(45) Date of Patent: Apr. 6, 2010

(54) OUTPUT YOKE SHAFT AND ASSEMBLY

(75) Inventors: Steve Slesinski, Kalamazoo, MI (US); Leo Wenstrup, Portage, MI (US); Gary Turner, Three Rivers, MI (US)

(73) Assignee: Dana Heavy Vehicle Systems Group, LLC, Toledo, OH (US)

( * ) Notice: Subject to any disclaimer, the term of this patent is extended or adjusted under 35 U.S.C. 154(b) by 1270 days.

(21) Appl. No.: 10/842,110

(22) Filed: May 10, 2004

(65) Prior Publication Data

US 2005/0247148 A1 Nov. 10, 2005

(51) Int. Cl.
*B60K 17/16* (2006.01)
*B60K 17/348* (2006.01)
*B62D 61/10* (2006.01)

(52) U.S. Cl. .............. 180/24.09; 475/230; 74/607; 384/571; 180/24.01

(58) Field of Classification Search ............... 384/571, 384/475; 180/24.01, 24.09, 24.11; 475/230, 475/231; 74/607; 464/16, 162
See application file for complete search history.

(56) References Cited

U.S. PATENT DOCUMENTS

| | | | |
|---|---|---|---|
| 2,303,180 A | 11/1942 | Swenson | |
| 2,524,853 A | 10/1950 | Szekely | |
| 3,146,842 A * | 9/1964 | Nelson et al. | 180/24.09 |
| 3,636,909 A | 1/1972 | Benson, Jr. | |
| 3,773,130 A * | 11/1973 | Mueller | 180/24.09 |
| 3,780,821 A * | 12/1973 | Prange | 180/250 |
| 3,887,037 A * | 6/1975 | Haluda et al. | 184/6.12 |
| 3,894,446 A * | 7/1975 | Snoy et al. | 475/88 |
| 4,194,586 A * | 3/1980 | Hicks | 180/24.09 |
| 4,914,979 A * | 4/1990 | Balmforth | 475/221 |
| 5,017,025 A * | 5/1991 | Williams | 384/584 |
| 5,628,688 A | 5/1997 | Eversole et al. | |
| 5,634,853 A | 6/1997 | Smith | |
| 5,716,276 A * | 2/1998 | Mangas et al. | 464/16 |
| 5,720,102 A | 2/1998 | McClanahan | |
| 5,806,371 A * | 9/1998 | Hibbler et al. | 74/409 |
| 5,950,750 A | 9/1999 | Dong et al. | |
| 6,502,996 B2 * | 1/2003 | Joki | 384/571 |
| 6,648,788 B1 * | 11/2003 | Sullivan | 475/221 |
| 6,918,851 B2 * | 7/2005 | Ziech et al. | 475/221 |
| 2003/0190992 A1 | 10/2003 | Holman et al. | |
| 2004/0079562 A1 * | 4/2004 | Oates et al. | 180/24.11 |

* cited by examiner

*Primary Examiner*—Paul N. Dickson
*Assistant Examiner*—George D. Spisich
(74) *Attorney, Agent, or Firm*—Marshall & Melhorn, LLC

(57) ABSTRACT

A drive axle assembly is provided with a reduced part count and improved alignment. The assembly includes a drive axle housing with input and output shafts and an inter-axle differential that is driven by the input shaft. The inter-axle differential is drivingly coupled to the output shaft and divides power between first and second axles. The output shaft is a unitary member and defines a yoke at one end disposed outside of the drive axle housing and restrained against axial movement within the drive axle housing. A bearing set is disposed between the output shaft and the drive axle housing and includes first and second bearing cones and a unitary bearing cup. The bearing cup includes threads that engage corresponding threads in the drive axle housing.

17 Claims, 3 Drawing Sheets

OUTPUT YOKE SHAFT AND ASSEMBLY

BACKGROUND OF THE INVENTION

1. Field of the Invention

This invention relates to drive axle assemblies, and, in particular, to a drive axle assembly having an improved structure for the output shaft and supporting bearings.

2. Discussion of Related Art

A conventional tandem drive axle assembly includes forward and rear drive axle assemblies and an intermediate drive shaft extending between the forward and rear drive axle assemblies. An inter-axle differential housed in one of the drive axle assemblies, typically the forward drive axle assembly, transfers power from the vehicle drive shaft and divides that power between forward and rear axles. The inter-axle differential transfers power to the rear drive axle assembly through an output shaft extending from the forward axle assembly and coupled to the intermediate drive shaft assembly.

In conventional drive axle assemblies, the output shaft described above is coupled to the intermediate drive shaft assembly through a yoke. The yoke is coupled to the output shaft through a spline connection and a nut retains the yoke on the end of the output shaft. The output shaft is supported for rotation within a housing of the forward drive axle assembly by inner and outer tapered roller bearings in endplay or a ball bearing. Conventional drive axle assemblies employing this arrangement have several disadvantages. The drive shaft requires two separate parts and is relatively costly and heavy and requires the use of a nut to retain the yoke on the shaft.

The inventors herein have recognized a need for a tandem axle assembly that will minimize and/or eliminate one or more of the above-identified deficiencies.

SUMMARY OF THE INVENTION

The present invention provides a drive axle assembly.

A drive axle assembly in accordance with one aspect of the present invention includes a drive axle housing with input and output shafts disposed within the drive axle housing. An inter-axle differential is driven by the input shaft and divides power between first and second axles. The inter-axle differential is drivingly coupled to the output shaft so as to provide power to one of the first or second axles. The output shaft is a unitary member and defines a yoke at one end that is disposed outside of the drive axle housing, the output shaft being restrained against axial movement within the drive axle housing.

The drive axle assembly in accordance with another aspect of the invention, includes a drive axle housing with input and output shafts disposed within the drive axle housing. An inter-axle differential is driven by the input shaft and divides power between a first and a second axle. The inter-axle differential is drivingly coupled to the output shaft so as to provide power to one of the first and second axles. A bearing set is disposed between the output shaft and the drive axle housing, the bearing set including first and second bearing cones that define first and second inner races, first and second tapered bearing members that are disposed within the first and second inner races, respectively, and, a unitary bearing cup that defines first and second outer races that are configured to receive the first and second bearing members. The bearing cup further defines a first plurality of threads on a radially outer surface that is configured to engage a second plurality of threads in the drive axle housing.

DETAILED DESCRIPTION OF THE EMBODIMENTS OF THE INVENTION

Figure 1:
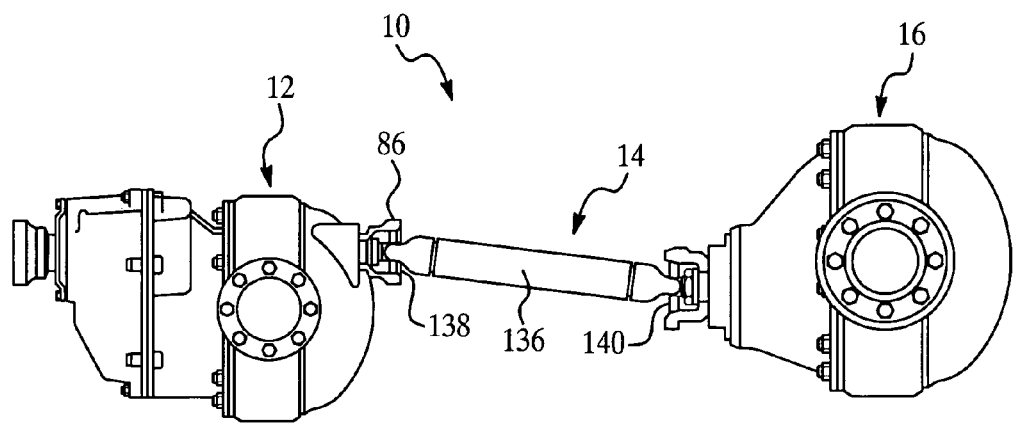
FIG. 1 is a side view of a tandem axle assembly incorporating a drive axle assembly in accordance with one embodiment of the present invention.

Referring now to the drawings wherein like reference numerals are used to identify identical components in the various views, FIG. 1 illustrates a tandem axle assembly 10. Axle assembly 10 is provided to support the frame (not shown) of a vehicle on a plurality of driven wheels (not shown). Assembly 10 is particularly adapted for use in medium and heavy trucks. It should be understood, however, that the present invention is not limited to use in medium or heavy trucks and may be used in a wide variety of vehicles and non-vehicular applications. Assembly 10 includes a drive axle assembly 12 in accordance with the present invention, an intermediate drive shaft assembly 14 and another drive axle assembly 16.

Figure 2:
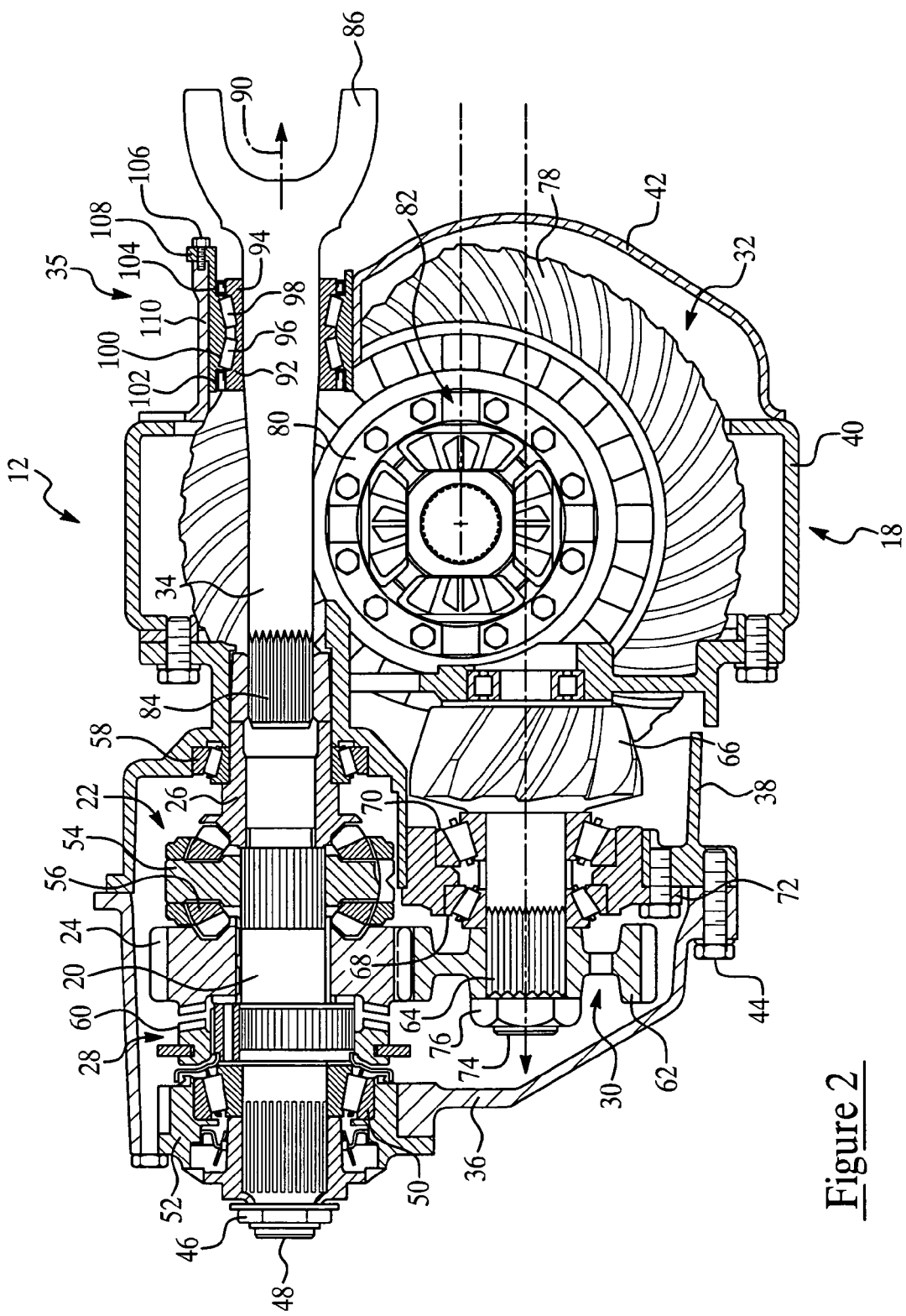
FIG. 2 is a cross-sectional view of a forward axle assembly in accordance with one embodiment of the present invention.

Axle assembly 12 is provided to drive wheels (not shown) supported on either side of assembly 12 on axle half shafts (not shown) extending from axle assembly 12. Assembly 12 may comprise a forward drive axle assembly of tandem axle assembly 10. Referring to FIG. 2, assembly 12 may include a housing 18, an input shaft 20, means, such as an inter-axle differential 22, for dividing power between assemblies 12, 16, side gears 24, 26, means, such as clutch 28, for locking differential 22, a pinion shaft assembly 30, a wheel differential 32, an output shaft 34, and a bearing set 35 supporting output shaft 34 for rotation within housing 18.

Housing 18 provides structural support for the other components of assembly 12. Housing 18 also protects the other components of assembly 12 from foreign objects and elements. Housing 18 may be made from conventional metals and metal alloys such as steel and may include multiple members 36, 38, 40, 42 that are sized relative to components of assembly 12 and coupled together using conventional fasteners 44.

Input shaft 20 is provided to transmit power from a drive shaft (not shown) to assemblies 12, 16. Input shaft is driven the drive shaft through a conventional input yoke (not shown). The input yoke may be splined to the forward end of input shaft 20 on splines (not shown) and may be retained thereon by a nut 46 and a washer (not shown) which are disposed about a threaded stud 48 that extends from shaft 20 and is integral therewith. Shaft 20 is journalled for rotation within housing 18 by bearings 50 which may comprise tapered roller bearings. The Bearings 50 may be retained in an adjuster 52.

Inter-axle differential 22 is provided to divide power between assemblies 12, 16 and is conventional in the art. Differential may include a spider 54 and differential gears 56.

Spider 54 provides a mounting arrangement for bevel gears 56 and is conventional in the art. Spider 54 may be coupled to input shaft 20 for rotation therewith using a spline connection or in other ways customary in the art.

Differential gears 56 are provided to divide and transfer torque from input shaft 20 to side gear 24 (for driving pinion shaft assembly 30 of drive axle assembly 12) and to gear 26 (for driving output shaft 34). Gears 56 are conventional in the art and may be made from conventional metals and metal alloys. Gears 56 are mounted on spider 54 for rotation with spider 54 and input shaft 20. The teeth on gears 56 engage corresponding teeth on gears 24, 26.

Input gear 24 transfers torque from inter-axle differential 22 (and indirectly from input shaft 20) to pinion shaft assembly 30. Gear 24 is also conventional in the art and may be made from conventional metals and metal alloys. Gear 24 is disposed about input shaft 20 and is freely rotatable thereon, being journalled on shaft 20 by bearings (not shown). Gear 24 includes a first set of teeth disposed on a rear planar surface that engage the teeth of bevel gears 56, a second set of teeth on a forward planar surface that engage clutch 28 and a third set of teeth disposed about the radial periphery of gear 24 for a purpose described hereinbelow.

Gear 26 transmits power received from inter-axle differential 22 to output shaft 34. Gear 26 is conventional in the art and may be made from conventional metals and metal alloys. Gear 26 is disposed about shaft 34 near the forward end of shaft 34 and may be coupled thereto by mating splines (not shown) on gear 26 and shaft 34. Gear 26 is journalled for rotation within housing 18 by bearings 58.

Clutch 28 is provided to selectively lock differential 22 and is conventional in the art. Clutch 28 may comprise a conventional sliding dog clutch that may be engaged by shifting a clutch member 60 with a first set of teeth into engagement with a clutch member (side gear 24 in the illustrated embodiment) having a second set of teeth using a shifting fork.

Pinion shaft assembly 30 transfers torque side gear 24 to wheel differential 32. Assembly 30 may include a driven gear 62, a pinion shaft 64, and a pinion gear 66.

Driven gear 62 is provided to transfer torque from side gear 24 to pinion shaft 64. Driven gear 62 may comprise a helical gear having teeth disposed about its radial periphery which engage corresponding teeth on gear 24. Gear 62 may be drivingly coupled to shaft 64 through axially-extending splines on shaft 64.

Pinion shaft 64 transmits torque to pinion gear 66 and is conventional in the art. Shaft 64 is supported for rotation within housing 18 by bearings 68, 70 supported within a bearing cage 72. A forward end of shaft 64 may define an integral threaded shank 74 configured to receive nut 76 to retain gear 62 on shaft 64. A rear end of shaft 64 is configured to receive pinion gear 66 thereon.

Pinion gear 66 transmits torque to wheel differential 32 and is also conventional in the art. Pinion gear 66 may comprise a hypoid gear and may be coupled to shaft 64 using a spline connection or in other ways customary in the art or may be integral with pinion shaft 64.

Wheel differential 32 is provided to enable the wheels (not shown) on opposite sides of drive axle assembly 12 to rotate at different speeds and is conventional in the art. Differential 32 is substantially disposed within axle housing member 42. Differential 32 is conventional in the art and includes a ring gear 78 in mesh with pinion gear 66, a differential case 80 coupled to ring gear 78 for rotation therewith, and a differential gear set 82 supported within case 80 and rotating in response thereto to transfer power to axle half shafts (not shown) driving the wheels (not shown).

Output shaft 34 is provided to transmit a portion of the power provided by input shaft 22 to the intermediate drive shaft assembly 14. Shaft 34 is coaxially disposed relative to gear 26 and includes a spline portion 84 at its forward end to which gear 26 is coupled. Shaft 34 extends through openings in housing members 38, 40, 42 and is journalled within an opening of housing member 42 by bearing set 35 which is described in greater detail hereinbelow. In accordance with one aspect of the present invention, shaft 34 is a unitary (i.e., one-piece) member and defines a yoke 86 at one end disposed outside of housing 18. Yoke 86 is coupled to drive shaft assembly 14 in a conventional manner as described hereinbelow. In the illustrated embodiment shaft 34 is solid. Shaft 34 is restrained against axial movement within housing 18. In the illustrated embodiment, bearing set 35 restrains shaft 34 against axial movement. It should be understood, however, that shaft 34 may be restrained in other ways (e.g., a circumferential tongue and groove connection). The incorporation of shaft 34 within assembly 12 is advantageous. First, shaft 34 reduces part count by combining the output shaft 34 and yoke 86 into a unitary member and eliminating the need for a nut or other means for retaining the yoke on the output shaft. Second, the combination reduces the weight and cost of drive axel assembly 12.

Bearing set 35 is provided for structural support for output shaft 34 and to allow shaft 34 to rotate relative to housing 18. Assembly 35 is disposed about an axis 90 extending through output shaft 34. In one embodiment, assembly 35 may include bearing cones 92, 94, bearing members 96, 98, a bearing cup 100, seals, 102, 104, and means, such as fastener 106, for restricting movement of bearing set 35 relative to housing 18.

Bearing cones 92, 94 defines inner races for bearing members 96, 98. Cones 92, 94 may also be made from conventional metals and metal alloys. In the embodiment illustrated in FIG. 2, bearing assembly 35 includes two bearing cones 92, 94 that are axially adjacent to one another. It should be understood by those of skill in the art, however, that a spacer could be inserted between cones 92, 94 and that size, shape, and configuration of the bearing cones 92, 94 could be modified without departing from the scope of the present invention. Each bearing cone 92, 94 may define a seat for a corresponding seal 102, 104, respectively.

Bearing members 96, 98 enable relative rotation between shaft 34 and housing 18 and are conventional in the art. Members 96, 98 may comprise tapered roller bearings that are held between cones 92, 94 and cup 100.

Bearing cup 100 defines outer races for bearing members 96, 98. Cup 100 may be made from conventional metals and metal alloys. Cup 100 may comprise a unitary bearing cup disposed radially outwardly of both bearing cones 92, 94. Cup 100 may define seats for seals 102, 104 opposite the seats formed in cones 92, 94. Cup 100 also defines a radially extending flange 108 at a rearward end. Flange 108 is configured to receive fastener 106 which extends through flange 108 and into housing member 42 of housing 18. In this manner, bearing set 35 is restricted from rotational movement upon insertion of bearing set 35. Bearing set further defines a plurality of threads 110 on a radially outer surface that are configured to engage a plurality of threads on a radially inner surface of housing member 42 of housing 18. Threads 110 allow for fine adjustment of bearing set 35 within housing 18.

Seals 102, 104 are provided to retain lubricants within bearing set 35. Bearing set 35 is therefore an example of a pre-lubricated assembly which does not require lubrication from the sump of axle assembly 12.

Figure 3:
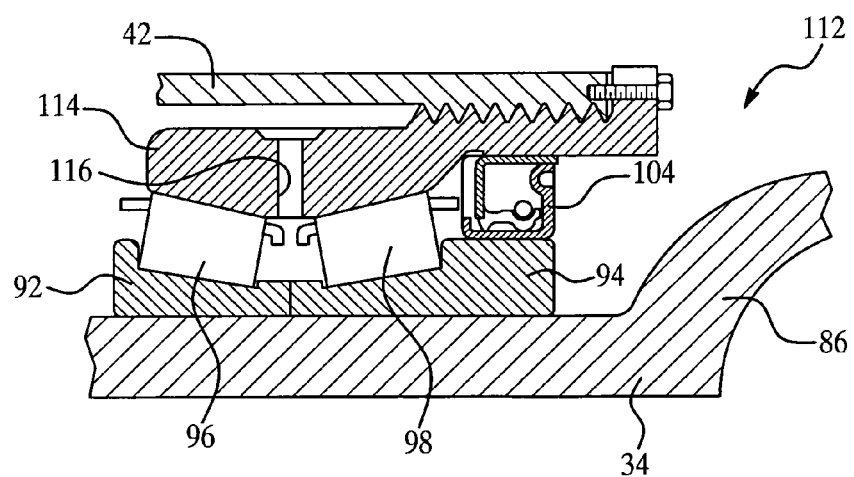
FIG. 3 is a cross-sectional view of a portion of a forward axle assembly in accordance with another one embodiment of the present invention.

Referring now to FIG. 3, another embodiment of a bearing set 112 for use in the present invention is illustrated. Bearing set 112 is substantially similar to bearing set 35 and reference may be had to the discussion hereinabove for similarly numbered components of bearing set 112. Bearing set 112 includes a bearing cup 114 that is substantially similar to bearing cup 100 of bearing set 35. Cup 114, however, define a passage 116 through which lubricant may flow to allow lubrication of bearing members 96, 98. Passage 116 may be centered between bearing cones 92, 94 and bearing members 96, 98 and extend radially outwardly. Passage 116 may have an outlet between bearing members 96, 98.

Figure 4:
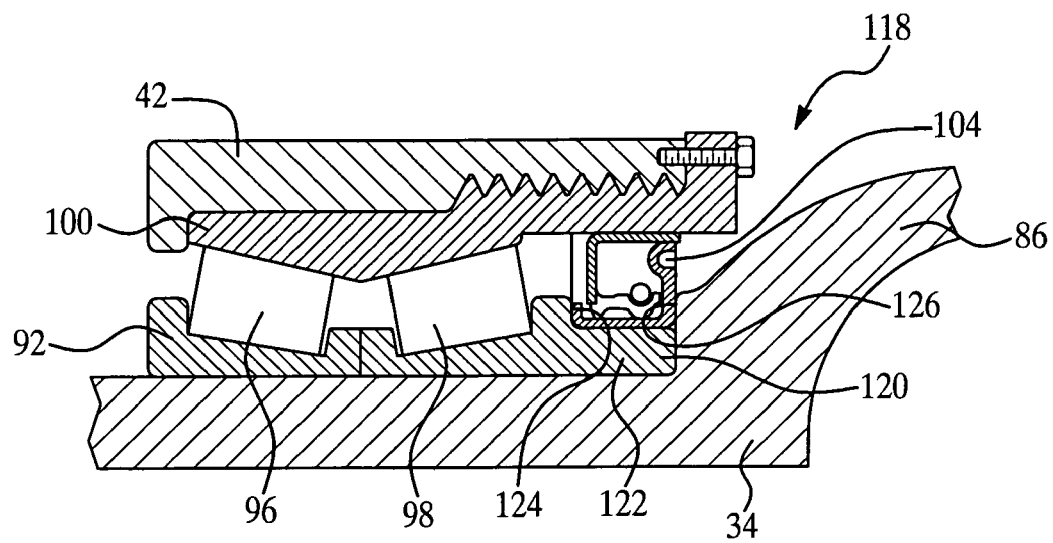
FIG. 4 is a cross-sectional view of a portion of a forward axle assembly in accordance with yet another embodiment of the present invention.

Referring now to FIG. 4, another embodiment of a bearing set 118 for use in the present invention is illustrated. Bearing set 118 is again substantially similar to bearing set 35 and reference may be had to the discussion hereinabove for similarly numbered components of bearing set 118. Bearing set 118 includes a rear bearing cone 120 with an axially extending portion 122. Portion 122 has a stepped diameter forming a shoulder 124. Seal 104 is seated between opposed seats formed in cup 100 and cone 120. Seal 104 is also seated and retained axially between shoulder 124 and an opposed shoulder 126 formed in the output shaft.

Figure 5:
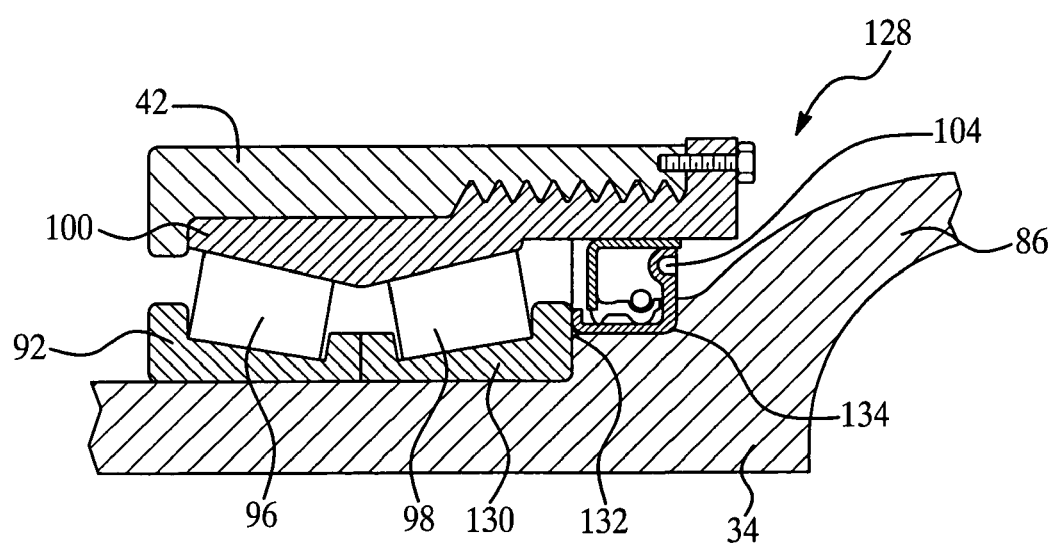
FIG. 5 is a cross-sectional view of a portion of a forward axle assembly in accordance with yet another embodiment of the present invention.

Referring now to FIG. 5, another embodiment of a bearing set 128 for use in the present invention is illustrated. Bearing set 128 is again substantially similar to bearing set 35 and reference may be had to the discussion hereinabove for similarly numbered components of bearing set 128. Bearing set 128 includes a rear bearing cone 130. A rearward end of bearing cone 130 forms a shoulder 132 with output shaft 34. Seal 104 is seated between opposed seats formed in cup 100 and shaft 34. Seal 104 is also seated and retained axially between shoulder 132 and an opposed shoulder 134 formed in shaft 34.

The use of any of bearing sets 35, 112, 118 or 128 is advantageous. Conventional drive axle assemblies use two separate tapered bearings in endplay. As a result, misalignment frequently occurs. Further, conventional bearing sets have a limited lifespan and relatively high seal runout.

Referring again to FIG. 1, intermediate drive shaft assembly 14 will be described in greater detail. Intermediate drive shaft assembly 14 is provided to transfer torque from output shaft 34 of forward axle assembly 12 to rear axle assembly 16. Assembly 14 may include an intermediate drive shaft 136, and conventional universal joints 138, 140. Intermediate drive shaft 136 transmits power between assemblies 12, 16. Shaft 136 is coupled to yoke 86 of output shaft 34 at a forward end through universal joint 138 and to a yoke extending from assembly 16 at a rear end through universal joint 140.

Rear axle assembly 16 is provided to drive wheels (not shown) supported on either side of assembly 16 on axle half shafts (not shown) extending from axle assembly 16. Assembly 16 is conventional in the art.

While the invention has been shown and described with referent to one or more particular embodiments thereof, it will be understood by those of skill in the art that various changes and modifications can be made without departing from the spirit and scope of the invention.

We claim:

1. A drive axle assembly, comprising: a drive axle housing; input and output shafts disposed within said drive axle housing;
an inter-axle differential driven by said input shaft and dividing power between first and second axles, said inter-axle differential drivingly coupled to said output shaft so as to provide power to one of said first and second axles;
a bearing set disposed between said output shaft and said drive axle housing, said bearing set including:
first and second bearing cones defining first and second inner races;
first and second tapered bearing members disposed within said first and second inner races, respectively; and,
a unitary bearing cup defining first and second outer races configured to receive said first and second bearing members, said bearing cup further defining a first plurality of threads on a radially outer surface configured to engage a second plurality of threads in said drive axle housing.

2. The drive axle assembly of claim 1 wherein the first cone and the unitary bearing cup define opposed seats for a first bearing seal.

3. The drive axle assembly of claim 2 wherein the second cone and the unitary bearing cup define opposed seats for a second bearing seal.

4. The drive axle assembly of claim 1 wherein the unitary bearing cup and said output shaft define opposed seats for a bearing seal.

5. The drive axle assembly of claim 1 wherein said first bearing cone and said output shaft define opposed seats for a bearing seal.

6. The drive axle assembly of claim 1 wherein said bearing set includes means for restricting movement of said bearing set relative to said drive axle housing.

7. The drive axle assembly of claim 6 wherein said restricting means comprises a fastener.

8. The drive axle assembly of claim 1 wherein said bearing cup defines a radially extending flange at one end, said flange configured to receive a fastener extending through said flange and into said drive axle housing.

9. The drive axle assembly of claim 1 wherein said unitary bearing cup includes a passage to allow lubrication of said bearing members.

10. The drive axle assembly of claim 9 wherein said passage has an outlet between said bearing members.

11. The drive axle assembly of claim 9 wherein said passage extends radially outward.

12. A drive axle assembly, comprising:
a drive axle housing;
input and output shafts disposed within said drive axle housing;
an inter-axle differential driven by said input shaft and dividing power between first and second axles, said inter-axle differential drivingly coupled to said output shaft so as to provide power to one of said first and second axles;
a bearing set disposed between said output shaft and said drive axle housing, said bearing set including:
first and second bearing cones defining first and second inner races;
first and second tapered bearing members disposed within said first and second inner races, respectively; and,
a unitary bearing cup defining first and second outer races configured to receive said first and second bearing members, said bearing cup further defining a first plurality of threads on a radially outer surface configured to engage a second plurality of threads in said drive axle housing
wherein said output shaft is a unitary member and defines a yoke at one end disposed outside of said drive axle housing, said output shaft restrained against axial movement within said drive axle housing.

13. The drive axle assembly of claim 12 wherein the first cone and the unitary bearing cup define opposed seats for a first bearing seal.

14. The drive axle assembly of claim 13 wherein the second cone and the unitary bearing cup define opposed seats for a second bearing seal.

15. The drive axle assembly of claim 12 wherein the unitary bearing cup and said output shaft define opposed seats for a bearing seal.

16. The drive axle assembly of claim 12 wherein said bearing set includes a means for restricting movement of said bearing set relative to said drive axle housing.

17. The drive axle assembly of claim 12 wherein said unitary bearing cup includes a passage to allow lubrication of said bearing members.

* * * * *